United States Patent
Sirpal et al.

(10) Patent No.: US 10,225,602 B1
(45) Date of Patent: Mar. 5, 2019

(54) SYSTEM AND METHOD FOR DIGITAL TELEVISION OPERATION AND CONTROL-CONTEXTUAL INTERFACE

(71) Applicants: Jamdeo Canada Ltd., Oakville (CA); Hisense Electric Co., Ltd., Qingdao, Shandong (CN); Hisense USA CORP., Suwanee, GA (US); Hisense International Co., Ltd., Qingdao, P.R.C. (CN)

(72) Inventors: Sanjiv Sirpal, Oakville (CA); Mohammed Selim, Oakville (CA); Alexander DePaz, Burlington (CA); Salvador Soto, Toronto (CA)

(73) Assignees: Jamdeo Canada Ltd., Oakville, ON (CA); Hisense USA Corp., Suwanee, GA (US); Hisense USA Corp., Qingdao, Shandong (CN); Qingdao Hisense Electronics Co., Ltd., Qingdao, Shandong (CN)

( * ) Notice: Subject to any disclaimer, the term of this patent is extended or adjusted under 35 U.S.C. 154(b) by 0 days.

(21) Appl. No.: 15/396,282

(22) Filed: Dec. 30, 2016

(51) Int. Cl.
*H04N 21/431* (2011.01)
*H04N 21/45* (2011.01)
*H04N 21/422* (2011.01)
*H04N 21/466* (2011.01)
*H04N 21/482* (2011.01)

(52) U.S. Cl.
CPC ... *H04N 21/4316* (2013.01); *H04N 21/42224* (2013.01); *H04N 21/4532* (2013.01); *H04N 21/4668* (2013.01); *H04N 21/4826* (2013.01)

(58) Field of Classification Search
CPC ................................................. H04N 21/4312
USPC ........................... 725/39, 40, 44, 45, 46, 52
See application file for complete search history.

(56) References Cited

U.S. PATENT DOCUMENTS

2004/0268403 A1* 12/2004 Krieger .............. H04N 5/44543
725/112
2009/0193464 A1* 7/2009 Friedlander ........ H04N 5/44543
725/41

* cited by examiner

*Primary Examiner* — Dominic D Saltarelli
(74) *Attorney, Agent, or Firm* — Gordon & Rees, LLP

(57) ABSTRACT

The present disclosure relates to digital television processes and systems. In one embodiment, a method of controlling a display device includes presenting, by a display device, display content. The display device can identify content titles associated with the display content, detection selection of a command, present a contextual overlay representation including content elements, detect a selection of the content overlay, and update presentation of the display device based on the selection of the content overlay.

18 Claims, 7 Drawing Sheets

SYSTEM AND METHOD FOR DIGITAL TELEVISION OPERATION AND CONTROL-CONTEXTUAL INTERFACE

FIELD

The present disclosure relates to electronic devices and applications, and more particularly to display and content presentation devices.

BACKGROUND

Recent television devices are designed and developed to provide application and network services in addition to traditional television functions for display of broadcasted content. With the addition of functionalities and components on television devices, there exists a need for control interfaces for applications and television components. In particular, there exists a need for programs and configurations that allow for features of the applications to be presented, accessed and customized on a digital television. While execution of an application and application interfaces exist for digital televisions, there exists a need for improved control of television features. It can be difficult for device manufactures to provide menu based configurations that fit all devices across different product markets. Moreover, there exists a desire for interfaces to be customizable. Conventional on-screen interfaces do not allow for customization. Moreover, the conventional interfaces require complex menus with distracting elements and can require extraneous actions for use. There is a desire for modified configurations to optimize control and experience of digital televisions.

BRIEF SUMMARY OF THE EMBODIMENTS

Disclosed and claimed herein are methods, devices and systems for control of a digital television. One embodiment is directed to a method of controlling a display device for presentation of a contextual interface. The method includes presenting, by a display device, display content. The display device can identify content titles associated with the display content, detection selection of a command, present a contextual overlay representation including content elements, detect a selection of the content overlay, and update presentation of the display device based on the selection of the content overlay.

In one embodiment, the display device is a digital television and the display content includes video content presented by the digital television.

In one embodiment, a contextual module of the display device identifies content titles.

In one embodiment, the command is a command of a capacitive touch sensor of a remote control device for the display device.

In one embodiment, wherein presentation is a gradual presentation of a center element followed by opposed lateral elements that form a bar. The bar can be a contextual bar that includes graphical elements presented as tiles for content associated with the display content. The contextual bar can include a gamification and/or badge element defined by one or more achieved predetermined thresholds.

In one embodiment, the content titles comprise one or more images associated with content, a channel and/or source identifier, and start and end times.

In one embodiment, the contextual overlay further comprises contextual elements based on associated with a selection of content defined by a dynamic review database. The contextual elements can include other episodes of display content being watched.

In one embodiment, the command is a contextual command of a capacitive touch sensor of a remote control device for the display device that causes presentation of upcoming titles when the display content is at a predetermined time position before completion of a viewing time of the display content. Alternatively or additionally, the display device can cause presentation of upcoming titles when the display content is at a predetermined time position before completion of a viewing time of the display content when the display content is at a predetermined percentage of completion of the viewing time.

In one embodiment, a system for controlling a display device for presentation of a contextual interface is disclosed. The system can include a display device comprising a display configured to present a control interface and a processor coupled to the display. The processor can be configured to presenting, by the display device, display content, identify, by the display device, content titles associated with the display content, detect, by the display device, selection of a command, present, by the display device, a contextual overlay representation including content elements, detect, by the display device, a selection of the content overlay, and update, by the display device, presentation of the display device based on the selection of the content overlay.

Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein.

DETAILED DESCRIPTION OF THE EXEMPLARY EMBODIMENTS

Overview and Terminology

Figure 1:
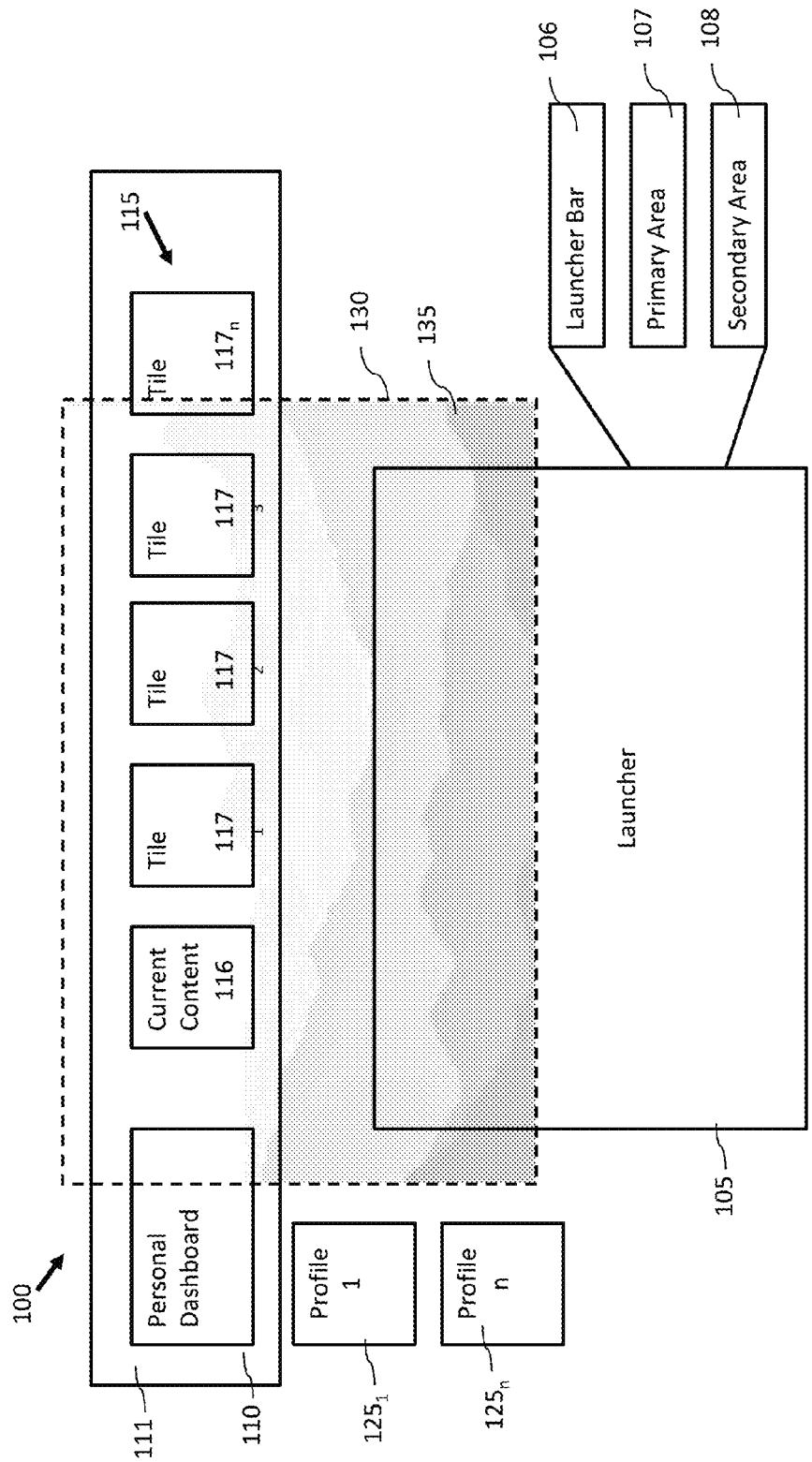
FIG. 1 depicts a graphical representation of a control interface of a display device according to one or more embodiments.

One aspect of the disclosure relates to providing a control interface for a digital television. In one embodiment, a system and framework are provided for presentation of a contextual interface. As used herein, a contextual interface includes presentation of a plurality of graphical tiles elements as an overlay to display content of a display device.

In one embodiment, the graphical tile elements relate to content that may be selected and presented by the display device. According to another embodiment, content identified by the display device for the contextual interface is selected by the display device to provide contextually relevant content titles. According to another embodiment, content of the contextual interface may be selected based characteristics of the current program displayed, including but not limited to genre (e.g., drama, television broadcast, movie, reality programming, news, sports, etc.), type (e.g., broadcast, video on demand, movie, input source), title and other parameters. In addition, the display device may identify content for the contextual interface based on the current time and content that is currently available.

According to another aspect, a display device configuration is provided for to generate elements of a contextual interface. For example, a display device may be configured to determine and generate a presentation format for the content titles. The display device can then presenting a contextual interface associated with display of content.

A contextual interface also provides a control interface for a display device. The display device can identify content titles associated with the display content, detect selection of a command, present a contextual overlay representation including content elements, detect a selection of the content overlay, and update presentation of the display device based on the selection of the content overlay.

In one embodiment, a contextual module or interface of the display device can identify content titles and command associated with a capacitive touch sensor of a remote control device. In one embodiment, the content titles comprise one or more images associated with content, a channel, a source identifier, and/or start and end times. In another embodiment, the contextual overlay can include contextual elements based on associated with a selection of content defined by a dynamic review database. The contextual elements can include other episodes of display content recently or presently watched. In one embodiment, the command is a contextual command of a capacitive touch sensor of a remote control device for the display device that causes presentation of upcoming titles when the display content is at a predetermined time position before completion of a viewing time of the display content. Alternatively or additionally, the display device can cause presentation of upcoming titles when the display content is at a predetermined time position before completion of a viewing time of the display content when the display content is at a predetermined percentage of completion of the viewing time.

In another embodiment, presentation is a gradual presentation of a center element followed by opposed lateral elements that form a bar. The bar can be a contextual bar that includes graphical elements presented as tiles for content associated with the display content. The contextual bar can include a gamification and/or badge element defined by one or more achieved predetermined thresholds.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

Referring now to the figures, FIG. 1 depicts a graphical representation of a control interface of a display device according to one or more embodiments. According to one embodiment, control interface 100 relates to a graphical user interface presented to control a display device, such as a digital television. According to one aspect of the disclosure, control interface 100 includes a plurality of components that each provide a plurality of functions and features for control and operation of a display device. In addition to providing separate components for particular interaction, control interface may also be configured to operate with a specific arrangement. According to one embodiment, presentation of each component of control interface 100 is presented based on a spatial arrangement model. According to one embodiment, the spatial arrangement model defines a relative position of components of control interface 100 to allow for directional navigation of the interface. By employing a spatial arrangement model, components of the control interface 100 allow for many features of the display device to be easily accessed and controlled. In addition to facilitating access, the spatial arrangement model provides a specific formatting to each view of control interface to emphasize elements for control.

According to one embodiment, components of control interface 100 include launcher component 105, dashboard component (e.g., personal dashboard) 110 and activity strip 115. According to another embodiment, a spatial arrangement model defines the location of each component of control interface 100 relative to a display screen. In an exemplary embodiment, launcher component 105 is oriented relative to a bottom portion of the display, dashboard component (e.g., personal dashboard) 110 is oriented relative to a left side of the display, and activity strip 115 is oriented relative a right side of the display. According to another embodiment, the display format of each component is defined by the spatial arrangement model such that each component may have an initial presentation characterized by a particular format, size, functionalities displayed, etc. Based on navigation commands relative to the control interface, the display device may update and rearrange the position and display format for each component of control interface 100.

Control interface 100 is shown in FIG. 1 relative to a display 130 and display content 135. According to one embodiment, the display format of control interface 100 can include presentation of some or all components of the control interface on display 130. Based on commands detected during presentation of the control interface 100, a display device may update the presentation format and elements of control interface 100 on display 130.

According to one embodiment, control interface 100 provides a mechanism for accessing multiple components of a display device. While the description of FIG. 1 discusses three components of control interface 100 (launcher component 105, dashboard component 110 and activity strip 115), it should be appreciated that additional components may be added to or included with control interface 100. As will be discussed herein, control interface 120 may be employed to control operation of digital television.

Activity bar includes plurality of tile elements 116 and $117_{1-n}$. According to one embodiment, presentation of control interface 100 may be presented as an overlay to content 135 presented on display 130. The display device may freeze or continue presenting the display output of content 135 in a tile element 116 in activity bar 115. In certain embodiments, navigation away from current content tile 116 will pause or stop playback. Current content tile 116 allows for selection of the previously displayed content to return to presentation of the display. Current content tile 116 is presented based on the content displayed by the display device prior to display of control interface 100. Tile elements $117_{1-n}$ relate to activity feed based on current content. In one embodiment, tile elements $117_{1-n}$ relate to a single type of content, such as broadcast TV shows related current content 116 and/or based on viewing habits of an active profile. According to another embodiment, tile elements $117_{1-n}$ may be a mix of content types, such as broadcast content, video on demand, applications, etc. In one embodiment, a display device may curate content and features to be included with activity bar as tile elements $117_{1-n}$ and present activity bar as a horizontal deck of elements in horizontal region 111. Horizontal region 111 allows for left and right directional commands to navigate to and within components of control interface 110.

Profiles $125_{1-n}$ relate to one user profiles stored by a display device for control interface 100. In one embodiment, profiles $125_{1-n}$ are utilized to determining display format of the personal dashboard component 110. According to another embodiment, one or more elements of launcher component 105 and activity strip 115 may be presented base on an active profile of profiles $125_{1-n}$. When a profile has not been selected, an active profile may be the last selected or utilized user profile.

According to another embodiment, components of control interface 100 may be selected, navigated and updated based on user interactions with a display device and one or more inputs from a remote control. According to one embodiment, elements of control interface 100 are presented by display device 130, such as digital television, as part of control interface 120.

Presentation of control interface 100 may be in response to a command from remote control, such as selection of a home or menu key. According to another embodiment, control interface 100 may be displayed shortly after a power on of display device 130. According to another embodiment control interface 100 may be presented following presentation of a wake animation and prior to display of a sleep or shutdown animation.

From control interface 100, several features and functions of a display device may be provided by ordered combinations of display device operation and graphical elements presented by the display device.

Launcher

According to one embodiment, launcher component 105 is configured to allow for a user to access content and control features of the display device. In one embodiment, launcher component includes a launcher bar 106, primary area 107 and secondary area 108. Launcher bar 106 may related to a plurality of tab elements arranged in a horizontal strip, wherein selection by moving a highlight element of the display device to a tab element will update the presentation elements of the launcher. By way of example, launcher bar 105 may include a tab for broadcast channels, video on demand and display device settings. Primary area 107 may include presentation of tile elements below the launcher bar 106. Tile elements of primary area 107 may be selected by the display device as the most relevant content of features associated with a selected tab element. Secondary area 108 may be presented below the primary area with additional tiles associated with content and/or display device function. Secondary area 108 may allow for additional selectable elements. According to one embodiment, the display format of launcher bar 106, primary area 107, and secondary area 108 may be based on the presentation status of the control interface. For example, launcher component may be presented initially with launcher bar 106, then commands to expand launcher component (e.g., a directional command) can result in display device updating the display output to include one or more tile elements of the primary area. Tile elements of the secondary area 108 may be presented based on additional navigation within the launcher component.

According to one embodiment, an initial format, such as a home screen presentation, of control interface 100 includes presentation of launcher bar, and a row of tile elements of the primary area. Based on a user input to select and/or navigate within launcher component 105, additional formats may be presented such as an increase in presentation footprint of the launcher to allow for secondary area 108 to include additional rows of tile elements. According to another embodiment, the primary area 107 and secondary area 108 of launcher component 105 may also include a first section for presentation of a most relevant tile element, and a second section for presentation of other tile elements along a horizontal display plane.

According to one embodiment, control interface 100 provides launcher component 105 as an overlay control interface to allow for presentation of content and control features based on selection of launcher tabs and navigation within the launcher component. In one embodiment, the configuration of launcher component 105 is a progression away from traditional desktop menus and allows for simple directional commands to access TV, network, applications, recommendations, personalized configurations, and recent content. According to another embodiment, launcher bar 106 of launcher component 105 includes a plurality of tab or tile elements, wherein each tab allows for a selection of a particular type of content, source of content, and/or control features of a display device. Based on the selection of a tab element of launch bar 106, launcher component may present multiple rows of content/element tiles and allows for scrolling to additional rows within a display window to provide and extended content region. In one embodiment, each row of content tiles may be navigated to based on vertical directional commands (e.g., up/down) and rows of content tiles may be navigated with horizontal directional commands (e.g., left/right). The presentation order of rows and even tiles in each row may be based on one or more of a selected user profile, content presented prior to display of control interface 100 and relevance determinations. In additional to content, such as video and programming information, tiles presented in launcher component 105 may relate to one or more of applications, settings, smart home applications, education/learning applications, gaming, etc.

Launcher Search

According to one embodiment, control interface 100 may include a search functionality component including a graphical interface for searching content titles, applications and elements of launcher component 105. In one embodiment, the search functionality may be presented as a drop down (e.g., down sliding transition) interface from an intermediary presentation format of control interface 100. According to another embodiment, the search functionality can interact with other devices (e.g., mobile devices) with a display device hosting a network interface for entry of search queries. Features of the search functionality can include one or more of a text entry box, alpha numeric display, recent search listing and suggested search results.

Personal Dashboard

According to one embodiment, control interface 100 includes dashboard component 110 to provide a user customizable control interface for a portion of the control features. In one embodiment, dashboard component 110 provides graphical elements for selecting and modifying display attributes and functionality of the dashboard. According to another embodiment, dashboard component can allow for a graphical selection of user profiles that can define features of control interface 100.

According to one embodiment, personal dashboard component 110 allows for presentation of a personalized control interface associated with a user profile. By way of example, display device is configured to allow a user to personalize the display format of the user interface to select display attributes such as a wallpaper, avatar, etc. In that fashion, dashboard component 110 allows for presentation of a personalized control interface. According to one embodiment, control interface 100 can allow for presentation of several user profiles $125_{1-n}$. Selection of the profile may be performed during navigation to personal dashboard component 110 within control interface 100. According to one embodiment, the initial display presentation format of personal dashboard component 110 relates to a tile element, such as a screen capture of the personal dashboard. When an intermediate display configuration of control interface 100 is provided, the same tile representing personal dashboard component 110 may be reformatted. According to one embodiment, personal dashboard component 110 may be displayed adjacent to activity bar 115 in a horizontal region 111 of the display.

In one embodiment, dashboard component 110 provides a display interface to include notifications and access to applications which may be run by a display device. According to another embodiment, dashboard component 110 allows for personalization such as one or more of wake/sleep animations, screensavers, audio themes, badges and gaming. Dashboard component 110 allows for a customizable interface within the overall control interface 100 of a display device.

Touch Interface

Presentation of elements within control interface can include one or more display formats and format changes. In certain embodiments, presentation of elements introduces similarities of touch commands to a display device operated from a distance without actual contact to the display. According to one embodiment, control interface 100 can update presentation of display elements such as tiles to gradually reveal content. According to one embodiment, control interface 100 can receive inputs based on a capacitive touch sensor with gradual display of elements, but also allowing for accidental touches. Capacitive interaction can provide a control feature with a level of touch control for a display device that is normally operated/viewed from a distance. Control interface 100 may be configured with an interaction to model tactile representation for interaction with elements based on a capacitive/interactive remote control. In one embodiment, interaction may include progressive disclosure of content, a multilayered preview into content and instant access to recommendation.

Contextual Touch

According to one embodiment, elements of control interface 100 can support presentation of tile elements as overlay to content without presentation of the full control interface. By way of example, a display device may be configured to recognize a category or genre of actively displayed content and present a display of similar programs to avoid the need to access a display menu and searching of content.

Instant Companion Application and Search

According to one embodiment, control interface 100 can allow for control of a display device by a mobile device and to allow for presentation of graphical display elements of control interface 100 to be displayed by a mobile device. In one embodiment, control interface 100 may host temporary access between a display device and another web enabled device. According to another embodiment, devices may be paired based on displayed elements that may be detected by the web enabled device. Thus, control interface 100 may be configured for pairing/connection with a user interface, such as a personalized user dashboard for display devices and search functions within the launcher control interface. According to certain embodiments, interaction of a mobile device with control 100 does not require a user to download a specific application to establishing the temporary network connection for interaction and control of a display device.

Smart Sense Recommendations

According to one embodiment, control interface 100 can utilize one or more processes for populating content elements within launcher component 105. According to one embodiment, control interface 100 may be presented based on processes for tracking and identifying content for recommendation within the launcher component. For example, content tiles may be arranged in groupings such that groupings with the highest contextual relevance priority are arranged towards the top of launcher component 105.

Conversense

According to one embodiment, control interface 100 and elements of control interface 100 can be utilized by a display device to present a display configured tailored to startup of the display device with information and display elements having high relevance. In one embodiment, elements of the startup display may be selected and presented based on a recognized time of day, personal settings and history.

Figure 2:
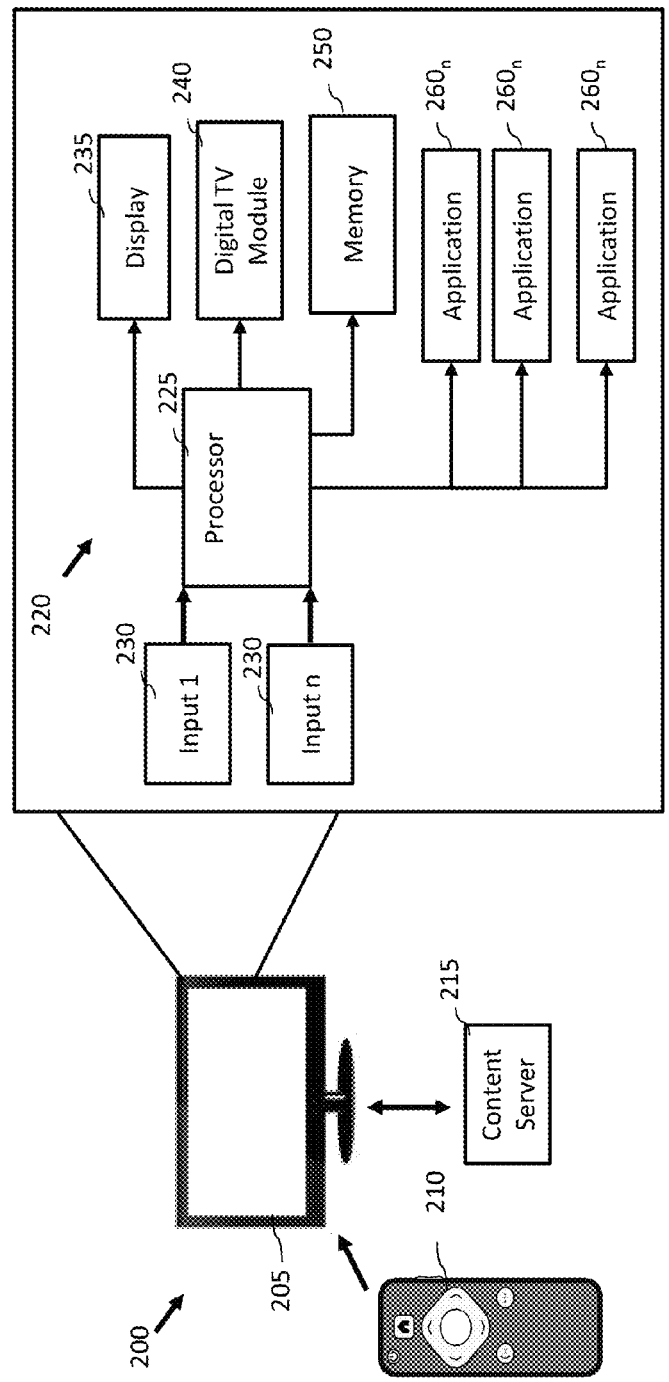
FIG. 2 depicts a simplified system diagram according to one or more embodiments.

FIG. 2 depicts a simplified system diagram according to one or more embodiments. System 200 includes display device 205 and remote control 210. Remote control 210 may be configured to provide commands for interaction with and control of display device 205 relative to a control interface (e.g., control interface 100) presented by display device 205. Content, applications and other network services may be provided to display device 205 by way of one or more content servers, such as content server 215.

Digital television 200 includes processor 225, inputs 230, display 235, digital TV module 240, memory 250, and applications $260_{1-n}$. It should be appreciated that digital television 205 may include one or more additional components not shown in FIG. 2. Digital television 205 is configured to present a control interface as described herein.

Inputs 230 relate to physical inputs for receiving video/image content and/or network data for presentation of content on display 235. Digital TV module 240 includes decoder/converter elements to receive information and content from inputs 230 which is then formatted and output to processor 225 for presentation on display 235. Memory 250 may include ROM and RAM memory for operation of digital television 205 and processor 225.

Processor 225, in addition to controlling operation of a digital television, is configured to control presentation and operation of a control interface. According to one embodiment, processor 225 is configured to detect commands for presentation of a control interface for the digital television, present the control interface including an expanded tab element and a plurality of tab elements. Processor 225 may also detect second or additional commands for the control interface to select one of the plurality of tab elements and update presentation of the control interface in response to the commands.

EXEMPLARY EMBODIMENTS

Figure 3:
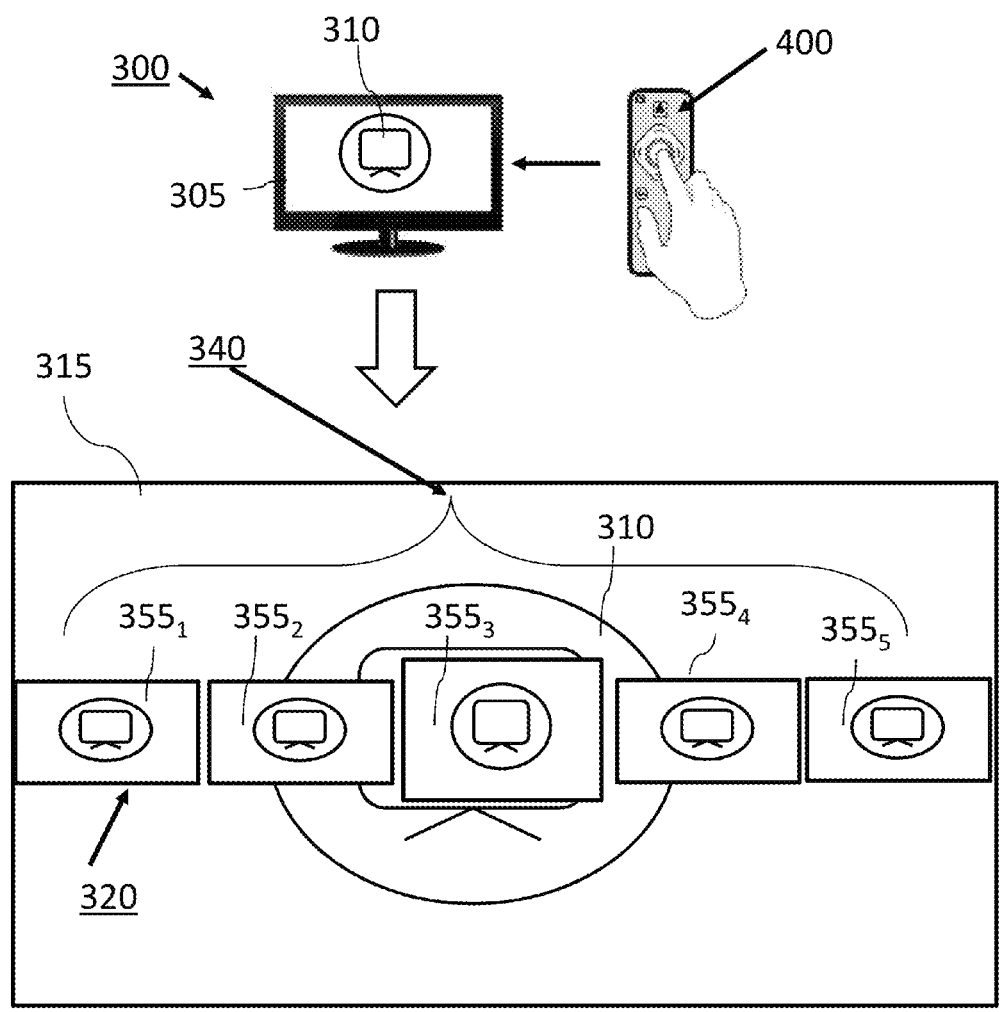
FIG. 3 depicts a graphical representation of a digital television control interface according to one or more embodiments.

FIG. 3 depicts a graphical representation of a system including a digital television configured to present a control interface according to one or more embodiments. System 300 of FIG. 3 depicts digital television 305 while presenting display content 310 associated with one or more content files. For example, display content 310 may be a clip, movie, episode, or the like and one or more control commands of content 310 and television 305 may be transmitted by remote control (e.g. control 400 of FIG. 4). According to one embodiment, digital television 305 includes display 315 configured to present control interface 320. As will be discussed herein, control interface 320 may be employed to control operation of digital television 305 while display content 310 is presented. According to another embodiment, control interface 320 may be presented, selected, navigated and updated based on user interactions with digital television 305 in connection with or while display content 310 is being presented and one or more inputs from remote control, including through one or more touch commands received by the control.

Control interface 320 may include a plurality of tab or tile elements, shown as $355_{1-n}$. Control interface 320 may be presented based on a predetermined user input received by remote control. The predetermined user input may include one or a combination of capacitive touch events defined by strength, duration, and/or location on one or more input surfaces of control. As discussed more particularly below, one capacitive touch event may include a "light" touch event that launches control interface 320, including a first contextual interface 340. As discussed more particularly below, contextual interface 340 may include a plurality of tab elements $355_{1-n}$ and may be presented with an extended presentation format (e.g., silo, expanded, highlighted, etc.) across a series and/or with a tab format. In addition, one of tab element (e.g., $355_3$ in FIG. 3) may be displayed, highlighted, and/or enlarged upon or in connection with presentation of contextual interface 340 as a cursor or spatial control associated with remote control being moved in a direction (e.g. horizontally, vertically, diagonally, etc.) along control interface 320. According to the embodiment, elements $355_{1-n}$ provide graphical representations of by content titles associated or otherwise related with the display content 310. For example, elements $355_{3-n}$ can be associated with content 310 in terms of different episodes of a season, different programs that include one or more overlapping personalities (e.g. actors, directors, producers, etc.), same or similar types (e.g. drama, comedy, sports, reality, etc.), predetermined acclaim, recommendations and/or related top picks, rating or reviews from private and/or public databases (e.g. average user rating, average critic rating, rating from a particular critic or publication, etc.), view count, or any other criteria that can determine a relationship between content 310 and content files that can be of interest to the viewer. In another embodiment, one or more of elements $355_{1-n}$ can be separated into related groups so that each group of elements relate to tiles over a common element. For example, elements $355_{1-n}$ can include a recommended collection of personalized content that pertain to a first group of elements, the first group corresponding to content contextually related to a current and/or prior usage of display 305. A second group may be directed towards critically acclaimed movies on a given topic. In this regard, the display 305 may be capable of detecting user profile information associated with the user operating the remote control, generate a set of contention recommendations and present these recommendations in a particular group of elements $355_{1-n}$ for selecting, previewing, and/or displaying on display 305.

According to another embodiment, contextual interface 340 may be presented manually (e.g., in response to a command from the remote control) or automatically (e.g., after a predetermined pause duration, a predetermined duration of display being in sleep mode, a predetermined period of time before conclusion of the display content 310). Contextual interface 340 can also be presented as a contextual overlay representation over content 310. For example, interface 340 can be presented so that only a portion of the display content 310 is obscured, covered, or otherwise covered by interface 340. In certain embodiments, interface 340 relates to an overlay that is presented as superimposed on content 310. Content 310 may continue to play or be otherwise presented in the background while the end user navigates interface 340 for content to select and update display 305 based on elements $355_n$. However, interface 340 is not so limited and may be presented in a display or interface separated altogether from content 310. Advantageously, however, the end user does not need to With contextual interface 340 being comprised of elements $355_n$ defined by one or more characteristics associated with display content 310, the user can select one or more elements $355_n$ and this selection can then be transmitted to and detected by display 305. Advantageously, presentation of interface 340 avoids the need for an end-user to access a main menu and search through scrolling list for additional content to access after finishing a viewing experience associated with content 310. In turn, interface 340 uniquely shortcuts control process for seeking, previewing, and/or accessing additional content to present on display 305 while also providing some considerations to an end-user associated with what content to view or access.

According to another embodiment, elements 355 includes a plurality of laterally spaced elements each associated with content that are presented to display device 305. However, the solution is not so limited and elements $355_n$ can be arranged in a row, a column, presented as a grid, matrix, or the like. For example, elements of interface 340 can be presented to include a plurality of tab different elements $355_{1-n}$ configured in a horizontal bar configuration on a display of digital television 305. According to one embodiment, a portion of the tab elements $355_{1-5}$ is presented on the horizontal bar, such that elements $355_{1-5}$ may be navigated, from the remote control via one or more touch commands sensed thereon, and presented on display 315, in interface 340 as display content 310 is presented. According to one embodiment, interface 340 may include a navigation bar which is part of a hierarchy of contextual control presentations. In one embodiment it is the transition point from viewing display content 310 to subsequent, potential content for presentation to display 305.

According to one embodiment, applying a capacitive input of a strength and/or duration may trigger control interface 340 and/or present related selectable elements 355$_{1-5}$. For example, in response to one or more touch commands sensed by the remote control, interface 340 can be presented and a wait state of display 315 may be entered so that one or more selections may be communicated from remote control to interface 340 based on whether a launcher application or other user interface, separate from the contextual interface 340, is present on display 315.

In certain embodiments, presentation of control interface 340 includes a horizontal bar of tab elements defined by content, wherein one tab element (e.g. 355$_3$ in FIG. 3) can then updated to be displayed in an expanded tab view following a user input or selection of that tab element.

According to one embodiment, a touch event at the remote control can be directly linked to a selection transmitted from control 300 and presented on display 315 in order for a user to select one of elements 355$_{1-5}$ and/or select one or more of elements 355$_n$ to be presented (e.g. present in a second page or second non-presented portion of interface 340) for preview, play action, or the like. According to another embodiment, presentation of elements 355$_{1-n}$ includes display of a symbol within each tab element and may also include a wallpaper or background image associated with content of the tab element.

Figure 4:
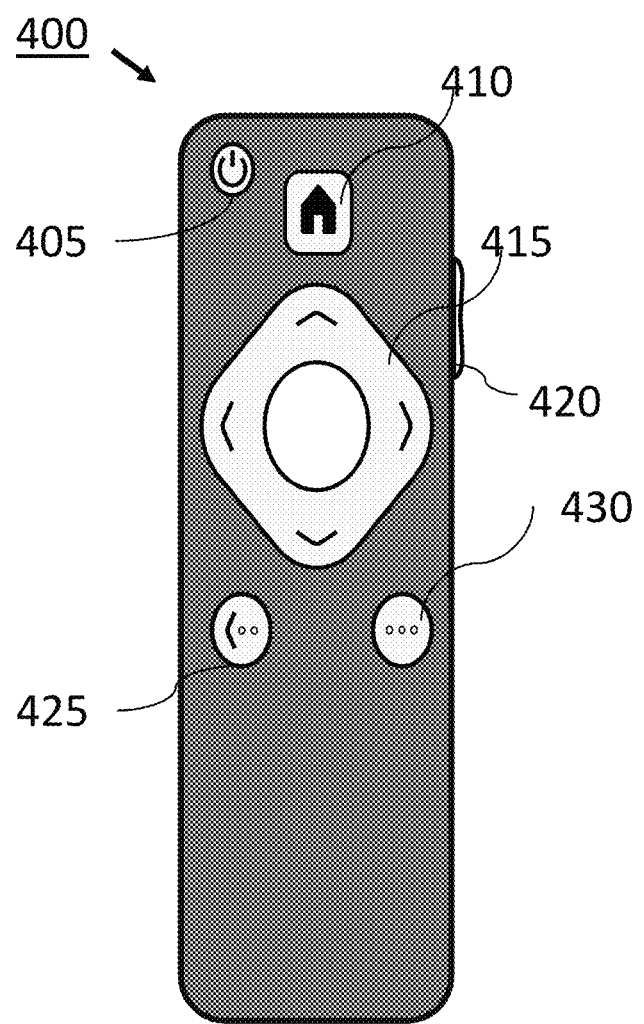
FIG. 4 depicts an example remote control according to one or more embodiments.

Turning to FIG. 4 is an exemplary remote control 400 to transmit commands to control interface 320 by selectively engaging one or more of the plurality of graphical elements that may be selected and interacted using touch commands. In certain embodiments, remote control 400 includes power button 405 (to turn on and off a digital television), home 410, directional pad and select 415, back 425, menu 430, and volume up/volume down 420. According to one embodiment, remote control 400 may be employed to navigate and select elements of a control interface using directional pad and select 415. For example, select 415 may be operable to receive and distinguish between a plurality of different touch commands based on duration, force, whether touch is presently being sensed, or the like.

In some embodiments, control 400 may be a specialized control as shown or may also be computing device such as a smart phone, a tablet, desktop computer, laptop computer, workstation computer, gaming console, eReader, smart watch, wearable device, or the like, that is communicatively coupled to a display device (e.g. display device 305). In this regards, one or more embodiments of the previously described system 300 of FIG. 3 and its method of controlling device 305 can be advantageously supported by numerous versions of a given web-based software package used by browser-based clients. For example, embodiments can be implemented using a back-end component without hardware requirements for execution, e.g., an application server, or that includes a front-end component, e.g., a client computer having a graphical user interface or a Web browser through which a user can interact with an implementation of the invention, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

According to one embodiment, a first touch event sensed by the remote control may cause control interface 320, and/or associated contextual interface 340, to be initially presented. For example, presentation of control interface 320 may be in response to a command from remote control, such as one or more operational or touch events. For example, control interface 320 may be displayed shortly after pressing an actuator of remote control or after activating a power on of digital television 305. According to another embodiment, control interface 320 may be presented following presentation of a wake animation and prior to display of a sleep or shutdown animation upon completion of presentation of display content 310.

Figure 5:
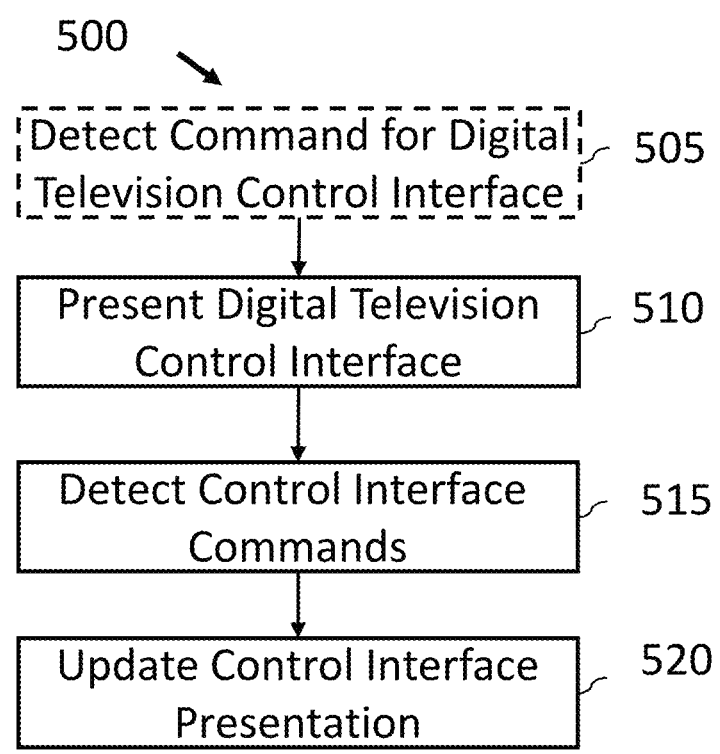
FIG. 5 depicts a graphical representation of digital television operation according to one or more embodiments.

FIG. 5 depicts an exemplary process for control of a digital television according to one or more embodiments. Process 500 may be employed to for control and/or presentation of a control interface (e.g., interface 340). Process 500 discusses, in part, operations of commands within a control interface (e.g., control interface 340) and updating presentation of the control interface. According to another embodiment, control interface commands can produce presentation of other forms or configurations of control interfaces. By way of example, process 500 may be employed to presentation of a control interface of a digital television.

Process 500 may be initiated by presenting a control interface for a digital television at block 510 as content is being displayed to the television. For example, a clip, an episode, a movie, etc. may be in the process of being presented on the television. In one embodiment, the control interface is presented at block 510 to include an expanded tab element configured to provide a plurality of selectable elements associated with a category or other identifying criteria of the display content and being presented as an expanded tab element, and a plurality of tab elements configured in a navigable, horizontal bar configuration on a display of the digital television.

According to another embodiment, presenting the control interface at block 510 includes one or more graphical elements determined by the digital television based on one or more of a setup procedure and use of the digital television. By way of example, tab elements may relate to live or fluid graphical elements that may be updated based on use of the digital television, including any of the previously described criteria with respect to tile elements (e.g. elements 355$_n$ of FIG. 3) as well as a user's previous selections, available content, personalization settings, etc. Thus, presentation of the control interface at a first point in time may include similar but different elements or configurations at a later point in time. By way of further example, in certain embodiments, one or both of the listing of tab elements and order of tab elements may remain the same, however presentation attributes of the tab elements and in particular graphical elements of the extended presentation format may be modified and updated by the digital television.

In certain embodiments, process 500 may optionally detect a command for a contextual control interface at block 505 prior to presentation of the interface at block 510. At block 515, the digital television detects a second command for the control interface to select one of the plurality of tab elements. According to another embodiment, selection of a tab element at block 505 relates to a navigational command to select a tab element, portion of a tab element, or navigation command in general with respect to the control interface. One or more control interface commands may be detected at block 515. According to one embodiment, control interface commands at block 515 relate to input commands for a control interface of the digital television configured as a hierarchical navigation pattern. In certain embodiments, selections of tab elements result in the digital television presenting one or more sheet views by the digital television. According to another embodiment, selections of tab elements results in launching a TV operation or application such as video on demand, a camera application, etc. At block 520, the digital television updates presentation of the control interface in response to the commands detected at block (e.g., second command). By way of example, the digital television can present a selected tab element with expanded configuration and/or provides a plurality of graphical elements.

Figure 6:
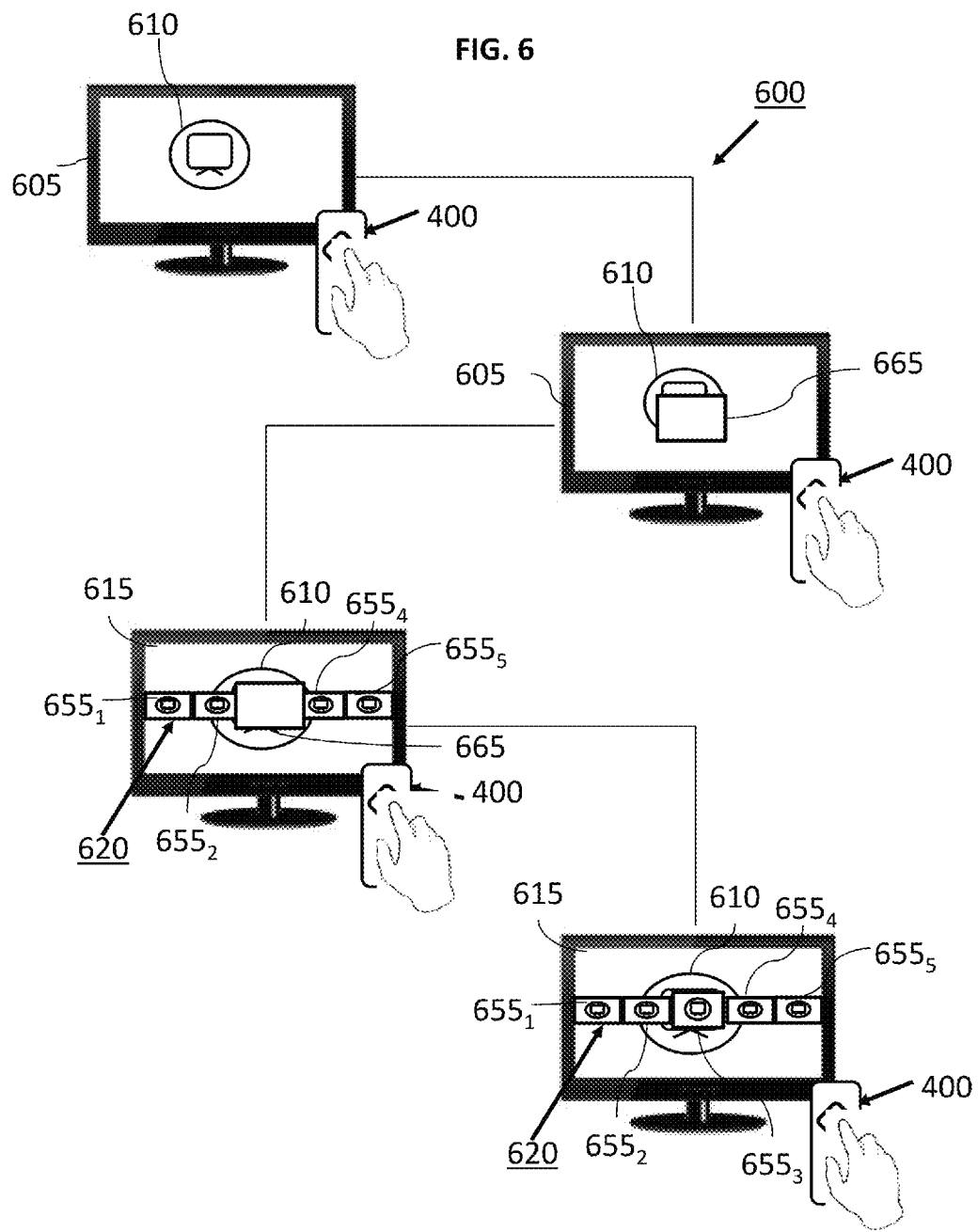
FIG. 6 depicts a graphical representation of a digital television control interface according to one or more embodiments.

FIG. 6 depicts a graphical representation of digital television operation 600 according to one or more embodiments. According to one embodiment of operation 600, television 605 may be presented with display content 610 being presented thereon (e.g. being played, streamed, or otherwise displayed). A first command may be transmitted from control 400 (e.g. a touch command of a first duration) so that presentation tile element 665 can be presented. Element 665 can present identifying information associated with display content, including prominent persons associated with the content, a title, a rating, an average user rating, a number of views, etc. In response to the first command or after detection of a second command, interface 640 can be presented with element 665 and/or overlaid display content 610. However, the operation 600 is not so limited and interface 640 may be presented separately from element 665.

In another embodiment, interface 640 may be presented as a capacitive touch layer representation and can include content elements (e.g. elements $655_n$) which are gradually presented based on the duration and/or strength of the touch command received. In another embodiment, elements of interface 640 may be gradually presented element by element (e.g. first element 665, then $655_1$, etc.). The duration, strength of other criteria can control the rate at which the touch layer of interface 640 is gradually presented. For example, if it is determined that the touch command has exceeded a predetermined duration, presentation of the touch layer is updated to display one or more graphical elements in response to the touch command exceeding the predetermined duration (e.g. element $655_1$ in the fourth step of operation 600 graphically depicted in FIG. 6). The touch layer of interface 640 may also display content with one or more graphical elements to signal touch command ability, thereby indicating to the user that additional touch commands can be transmitted. Upon presentation of the touch layer of interface 640, one or more selection and/or navigation commands may be detected by control 400 and transmitted to display 605 so that display is updated with content associated with the transmitted command. In certain embodiments, detection of the command can cause presentation of the contextual touch layer to overlay display content 610 without a user having to return to a home screen or home database.

In another embodiment, tiles associated with element $655_n$ can be cycled through transmission of one or a combination of commands from control 400 so that a partial or complete portion of a content title associated with a respective element $655_n$ to be presented on display. In another embodiment, elements $655_n$ can be presented in a scrollable navigation bar that provides feedback on the current view as well as manual navigation through views. Additionally, continuing to touch or hold a touch command after the element $655_n$ initially renders, then lifting or releasing the touch command, causes the tile to be vanished from the display thereby allowing users to preview or peek into the selected element $655_n$ as well as dismiss it using only one remote key interaction.

Figure 7:
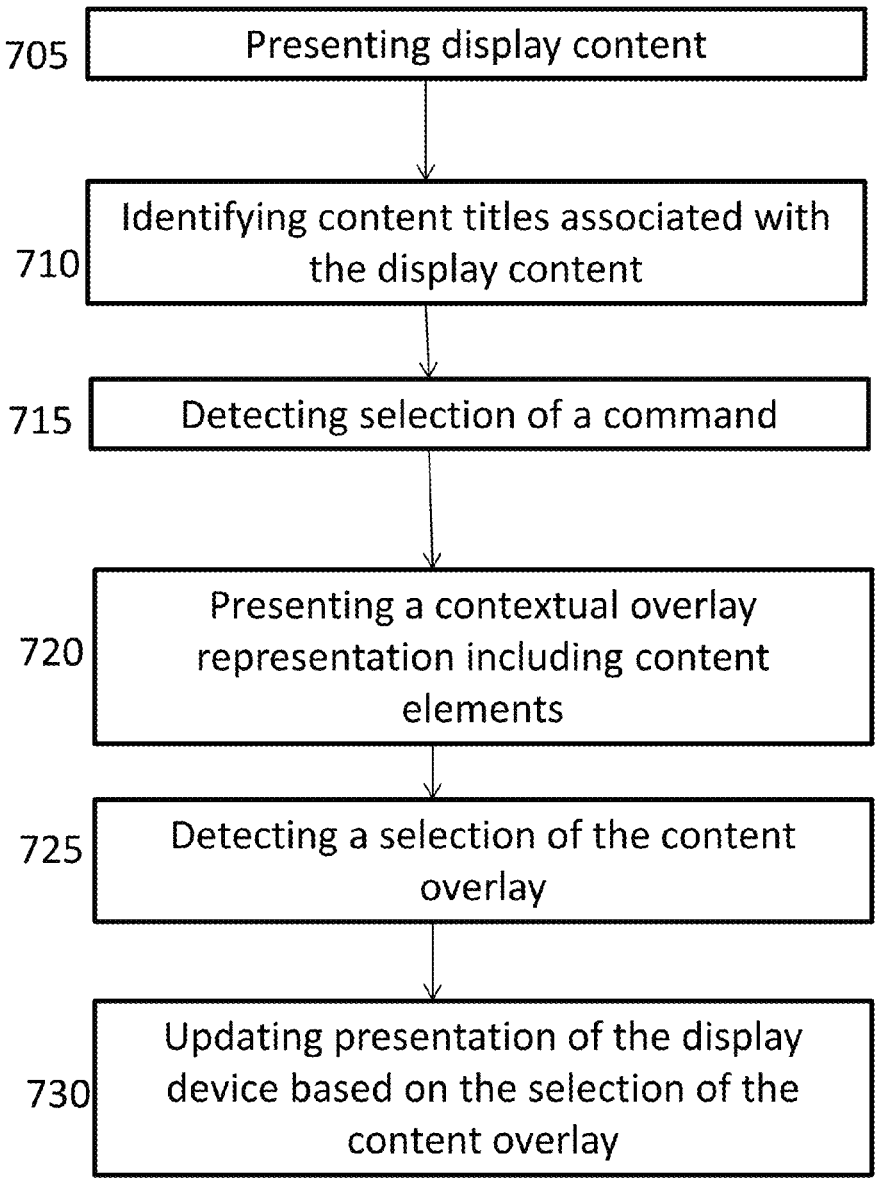
FIG. 7 depicts a schematic overview of a method controlling a display device.

Turning to FIG. 7, a schematic overview of an operation 700 is depicted according to this disclosure. In step 705, display content is presented by a display device. In step 710, the display device identifies content titles associated with the display content. In step 715, the display device detects a selection of a command. In step 720, the display device presents a contextual overlay representation including content elements. In step 725, the display device detects a selection of the content overlay. In step 730, the display device updates presentation of the display device based on the selection of the content overlay.

While this disclosure has been particularly shown and described with references to exemplary embodiments thereof, it will be understood by those skilled in the art that various changes in form and details may be made therein without departing from the scope of the claimed embodiments.

What is claimed is:

1. A method of controlling a display device for presentation of a contextual interface, the method comprising:
   presenting, by a display device, display content;
   identifying, by the display device, upcoming content titles associated with the display content;
   detecting, by the display device, selection of a command of a capacitive touch sensor of a remote control device for the display device, wherein the command causes presentation of graphical elements for at least one the upcoming content titles;
   presenting, by the display device, a contextual overlay representation including content elements for the graphical elements of the at least one upcoming titles;
   detecting, by the display device, a selection of the content overlay, the selection including at least one of the graphical elements of the upcoming titles; and
   updating, by the display device, presentation of the display device based on the selection of the content overlay, wherein updating includes presenting at least a preview portion of a content title within a graphical element of the upcoming title based on a duration of the selection of the capacitive touch sensor.

2. The method of claim 1, wherein the display device is a digital television and wherein the display content includes video content presented by the digital television.

3. The method of claim 1, wherein a contextual module of the display device identifies content titles based on one or more of time of day, genre of the display content, and/or user viewing history.

4. The method of claim 1, wherein the command is for the upcoming content titles when the display content is at a predetermined time position before completion of a viewing time of the display content.

5. The method of claim 1, wherein presentation of the contextual overlay representation is a gradual presentation of a center element followed by opposed lateral elements to form a bar.

6. The method of claim 5, wherein the bar is a contextual bar including graphical elements presented as tiles for content associated with the display content.

7. The method of claim 6, wherein the contextual bar includes a gamification and/or badge element defined by one or more achieved predetermined thresholds.

8. The method of claim 1, wherein content titles comprise one or more images associated with content, a channel and/or source identifier, and start and end times.

9. The method of claim 1, wherein the contextual overlay further comprises contextual elements based on associated with a selection of content defined by a dynamic review database.

10. The method of claim 9, wherein the contextual elements comprise other episodes of display content being watched.

11. The method of claim 1, wherein the command is a contextual command of a capacitive touch sensor of a remote control device for the display device that causes presentation of upcoming titles when the display content is at a predetermined percentage of completion of the viewing time.

12. A system for controlling a display device for presentation of a contextual interface:
the display device comprising:
a display configured to present a control interface; and
a processor coupled to the display, the processor configured to control presentation by the display device of display content;
identify upcoming content titles associated with the display content;
detect selection of a command of a capacitive touch sensor of a remote control device for the display device, wherein the command causes presentation of graphical elements for at least one the upcoming content titles;
present a contextual overlay representation including content elements for the graphical elements of the at least one upcoming titles;
detect a selection of the content overlay, the selection including at least one of the graphical elements of the upcoming titles; and
update presentation of the display device based on the selection of the content overlay, wherein updating includes presenting at least a preview portion of a content title within a graphical element of the upcoming title based on a duration of the selection of the capacitive touch sensor.

13. The system of claim 12, wherein the display device is a digital television and wherein the display content includes video content presented by the digital television.

14. The system of claim 12, wherein a contextual module of the display device identifies content titles based on one or more of time of day, genre of the display content, and/or user viewing history.

15. The system of claim 12, the system further comprising a remote control device operatively connected to the display device, wherein the command is for the upcoming content titles when the display content is at a predetermined time position before completion of a viewing time of the display content.

16. The system of claim 12, wherein presentation of the contextual overlay representation is a gradual presentation of a center element followed by opposed lateral elements to form a bar;
wherein the bar is a contextual bar includes graphical elements presented as tiles for content associated with the display content; and
wherein the contextual bar includes a gamification and/or badge element defined by one or more achieved predetermined thresholds.

17. The system of claim 12, wherein the contextual overlay further comprises contextual elements based on associated with a selection of content defined by a dynamic review database; and
wherein the contextual elements comprise other episodes of display content being watched.

18. The system of claim 12, wherein the command is a contextual command of a capacitive touch sensor of a remote control device for the display device that causes presentation of upcoming titles when the display content is at a predetermined percentage of completion of the viewing time.

* * * * *